(12) United States Patent
Foslien et al.

(10) Patent No.: US 6,480,443 B1
(45) Date of Patent: Nov. 12, 2002

(54) METHOD AND SYSTEM FOR RESTRAINING A CARTRIDGE WITHIN AN INSERTABLE MAGAZINE

(75) Inventors: Wayne E. Foslien, Greeley; Robert L. Mueller, Windsor; Paul C. Coffin; Gregg S. Schmidtke, both of Fort Collins, all of CO (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/549,792

(22) Filed: Apr. 14, 2000

(51) Int. Cl.⁷ .................. G11B 21/08; G11B 17/04; G11B 17/08
(52) U.S. Cl. ................ 369/30.42; 369/178.01
(58) Field of Search ............ 369/178.01, 30, 369/176, 178, 36, 191, 30.06, 30.4, 30.42, 30.68, 30.69; 360/98.04, 98.06

(56) References Cited

U.S. PATENT DOCUMENTS

| | | | |
|---|---|---|---|
| 4,868,805 A | 9/1989 | Hanami et al. ............... 369/53 |
| 4,914,421 A | 4/1990 | d'Alayer de Costemore d'Arc et al. ........................ 340/568 |
| 5,163,037 A | 11/1992 | Ohmori et al. ............ 369/77.2 |
| 5,164,934 A | 11/1992 | Kase et al. ................ 369/77.1 |
| 5,164,935 A | 11/1992 | Shimegi et al. ........... 369/77.2 |
| 5,612,940 A | 3/1997 | Otsuka et al. ............. 369/77.2 |
| 5,700,125 A | 12/1997 | Falace et al. ............... 414/276 |
| 5,719,833 A | 2/1998 | Jones ..................... 369/30.43 |
| 5,867,458 A | 2/1999 | Barkley et al. .......... 369/30.44 |
| 5,936,795 A * | 8/1999 | Theobald et al. ............. 360/92 |
| 5,999,500 A * | 12/1999 | Mueller ....................... 369/35 |
| 6,042,205 A | 3/2000 | Coffin et al. ............. 312/332.1 |
| 6,259,578 B1 * | 7/2001 | Christiansen et al. ......... 360/92 |

FOREIGN PATENT DOCUMENTS

EP          0856844 A1     8/1998

* cited by examiner

*Primary Examiner*—Robert S. Tupper
*Assistant Examiner*—Julie Anne Watko
(74) *Attorney, Agent, or Firm*—David M. Mason

(57) ABSTRACT

In general, the present invention provides an autochanger device having a cavity for receiving a magazine containing a media cartridge, wherein a retention arm of the cavity retrains the media pieces within the magazine while the magazine fills the cavity. In particular, a detent mechanism attached to the magazine interacts with the retention arm of the library, via a magazine transport handle, to secure media cartridges contained within the magazine as the magazine is received by a cavity of the autochanger.

16 Claims, 7 Drawing Sheets

METHOD AND SYSTEM FOR RESTRAINING A CARTRIDGE WITHIN AN INSERTABLE MAGAZINE

BACKGROUND OF THE INVENTION

1. Field of the Invention

This invention relates in general to a media holding device for use in an autochanger, and more particularly to a magazine that restrains media cartridges from being dislodged when inserted into an autochanger library assembly.

2. Description of the Related Art

Autochangers are devices that read/write data from/to media pieces. The media pieces are stored in a plurality of storage slots, sometimes referred to as a library, which are located within the physical structure of the autochanger. At least one media "player" or "drive" is also located within the physical structure of the autochanger and serves to read and write data from and to the media pieces. A media handling device, often referred to herein simply as a picker, is also located within the autochanger and serves to transport the media pieces between the library and the media player. Autochangers may be adapted to operate with several different media formats, thus "media pieces" may comprise optical discs, magnetic discs, and magnetic tapes, e.g., digital linear tapes, CD's etc.

The library portion of an autochanger may comprise a removable magazine that is used to store media pieces. The magazine typically has a plurality of holding locations adapted to hold the media pieces. A user places the media pieces into the magazine holding locations and then places the magazine into the library portion of the autochanger. A user inserts each magazine into a library portion by applying a force to the magazine until an inserted portion of the magazine is stopped by an interior structure of the library.

When a specific media piece must be transported from the magazine to the media player, the picker extracts the media piece from the library, moves the extracted media piece to the media player, and inserts the extracted media piece into the media player. Likewise, when a media piece is no longer required in the media player, the picker reverses the above-described procedure and transports the media piece from the media player back to the magazine. The autochanger tends to be a very compact unit, therefore, the picker typically comes in close proximity to the media pieces located in the magazine as it moves throughout the autochanger. In addition, the picker applies the greatest force used in the autochanger, about one to seven pounds, therefore the picker provides one of the highest operating and manufacturing costs of any one component of the autochanger.

The media pieces are secured in each holding location of a magazine in order to keep them from inadvertently slipping out of the magazine, while the magazine is being inserted into or stored within an autochanger library assembly. However, the user may, as an example, inadvertently insert the magazine into the library with such force that a media piece will be dislodged from its holding location to a position that is inaccessible by the media player. In this situation, a media piece will be located at an improper location inside the autochanger. When the picker moves within the autochanger, it may impact an improperly located media piece, which will likely stop the picker of the autochanger and may require a service call.

As eluded to above, the conventional securing or detent mechanism typically used to secure the media pieces within the magazine does not adequately restrain media pieces when the magazine is loaded into an autochanger library assembly. If the force associated with the detent mechanism is increased to overcome this problem, the picker must apply a substantial force to the media pieces in order to remove them from the magazine.

Overcoming this substantial force typically requires that the picker exert a force greater than three pounds on the media pieces. A picker with this force capability generally requires an expensive servo motor and other heavy-duty components that comprise the servo mechanism. Furthermore, the servo motor would need to draw a significant amount of power from the autochanger in order to overcome the securing force, which requires that the autochanger be provided with a power supply that is capable of delivering relatively high power to the picker. Consequently, a picker having the capability to apply a substantial force would invoke a significantly increase in the size, cost, and weight of the autochanger.

Therefore, a need exists for a magazine that can retain media pieces within the magazine as the magazine is being loaded into the autochanger library assembly.

SUMMARY OF THE INVENTION

In one aspect of the present invention, an autochanger system is provided having a cavity for receiving a magazine containing a media cartridge. The magazine includes a detent mechanism that bends to allow the media cartridge to move into and out of the magazine. The system comprises a movable arm coupled within the cavity having first and second positions, wherein the position of the arm controls the bending of the detent mechanism as the cavity receives the magazine and while the magazine fills the cavity.

In another embodiment of the invention, a method is provided for securing a media piece within a magazine being received by a storing location of an autochanger library. In particular, the method comprises: locating a media piece in a holding location of the magazine; engaging a detent element with the media piece to apply a first force for securing the media piece within the magazine; locating the magazine in the storing location of the autochanger library, the library includes a movable arm positioned above the detent element of the stored magazine; and engaging a portion of the arm with the detent element to apply a restraining force to the detent element.

In still another embodiment of the invention, the present invention provides an autochanger device that includes a library having a cavity for receiving a magazine containing a media cartridge. The magazine includes a detent mechanism that flexes to allow the autochanger device to remove/insert the cartridge from/into the magazine when the magazine fills the cavity. The device includes a movable arm coupled to the cavity having a first position and a second position, the first position restrains the detent mechanism from flexing as the magazine fills the cavity and the second position allows the detent mechanism to flex while the magazine fills the cavity.

BRIEF DESCRIPTION OF THE DRAWINGS

Other aspects and advantages of the invention will become apparent upon reading the following detailed description and upon reference to the drawings, in which.

Figure 1:
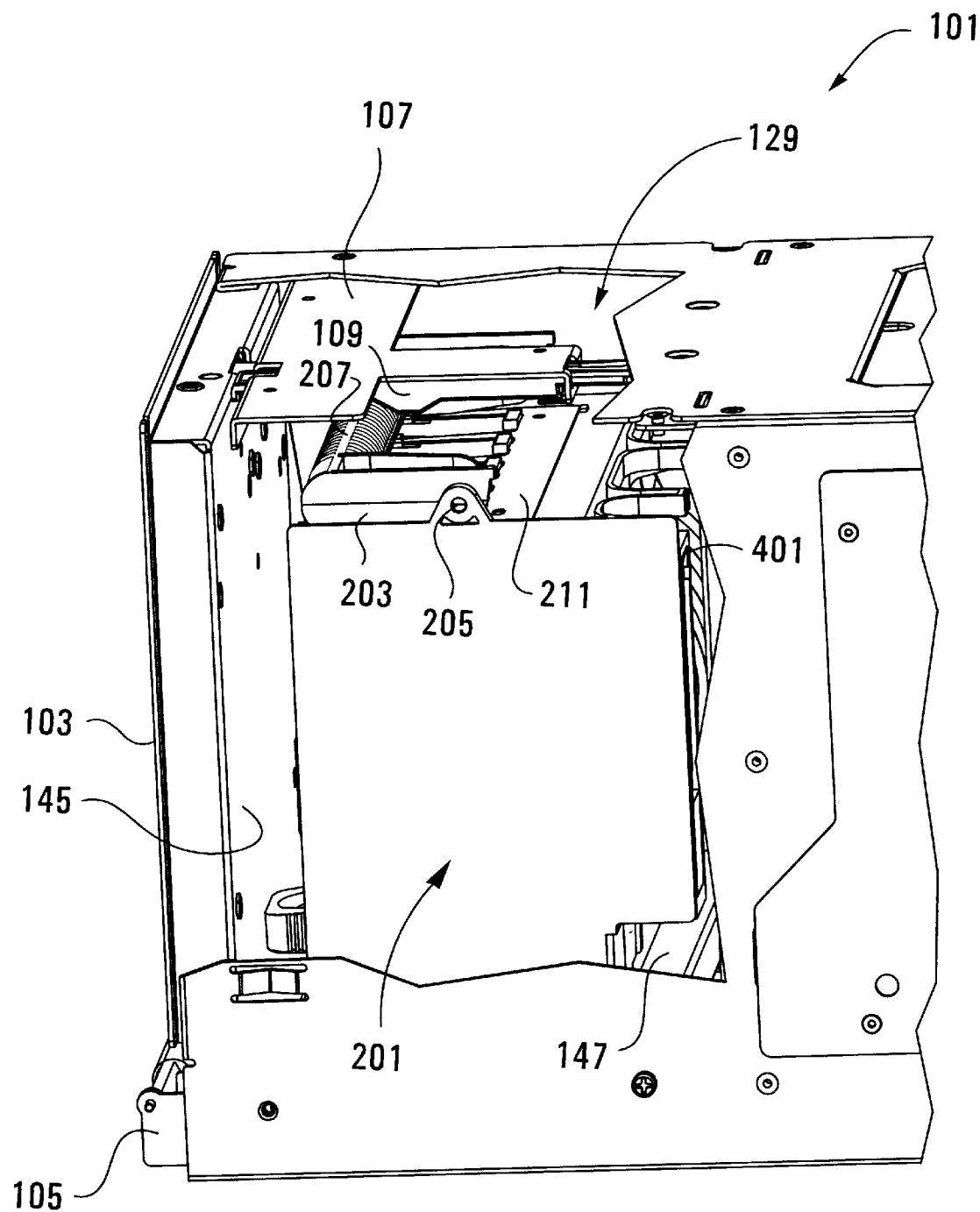
FIG. 1 illustrates a perspective cutaway view of an autochanger library containing the inventive cartridge restraining system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In general, the present invention provides a magazine that includes a mechanism for securing media pieces within the magazine while being positioned and secured within a library of an autochanger. In particular, a detent mechanism attaches to the magazine such that a relatively small force can be applied to a media cartridge contained therein. A handle, also attached to the magazine, interacts with a stop bracket assembly attached to the inner walls of the library to provide an additional restraining force to the detent mechanism while the magazine is being inserted into the library of the autochanger.

Referring now to the drawings, FIG. 1 illustrates a portion of an autochanger library structure 101 for receiving a magazine 201 having at least one media piece 401 contained therein. A door 103 of the library structure 101 pivots about a hinge 105 to enclose the magazine 201 within a cavity 129 of the library structure 101. A "T" shaped stop bracket 107 attaches within the library cavity 129 and provides a restraining arm or sleeve 109. As will be described in more detail below, the restraining sleeve 109 interacts with the magazine 201 located within the library and with an interior surface 145 of the library door 103 to prevent or allow the movement of the media piece 401 being contained by the magazine.

Generally, the magazine 201 includes a handle 203 pivotally mounted to transport tabs 205 located at either end of the magazine. The handle 203 provides a grip 207 for carrying the magazine 201 and for interacting with a detent mechanism 211 when the magazine is inserted within the library as illustrated.

Figure 3:
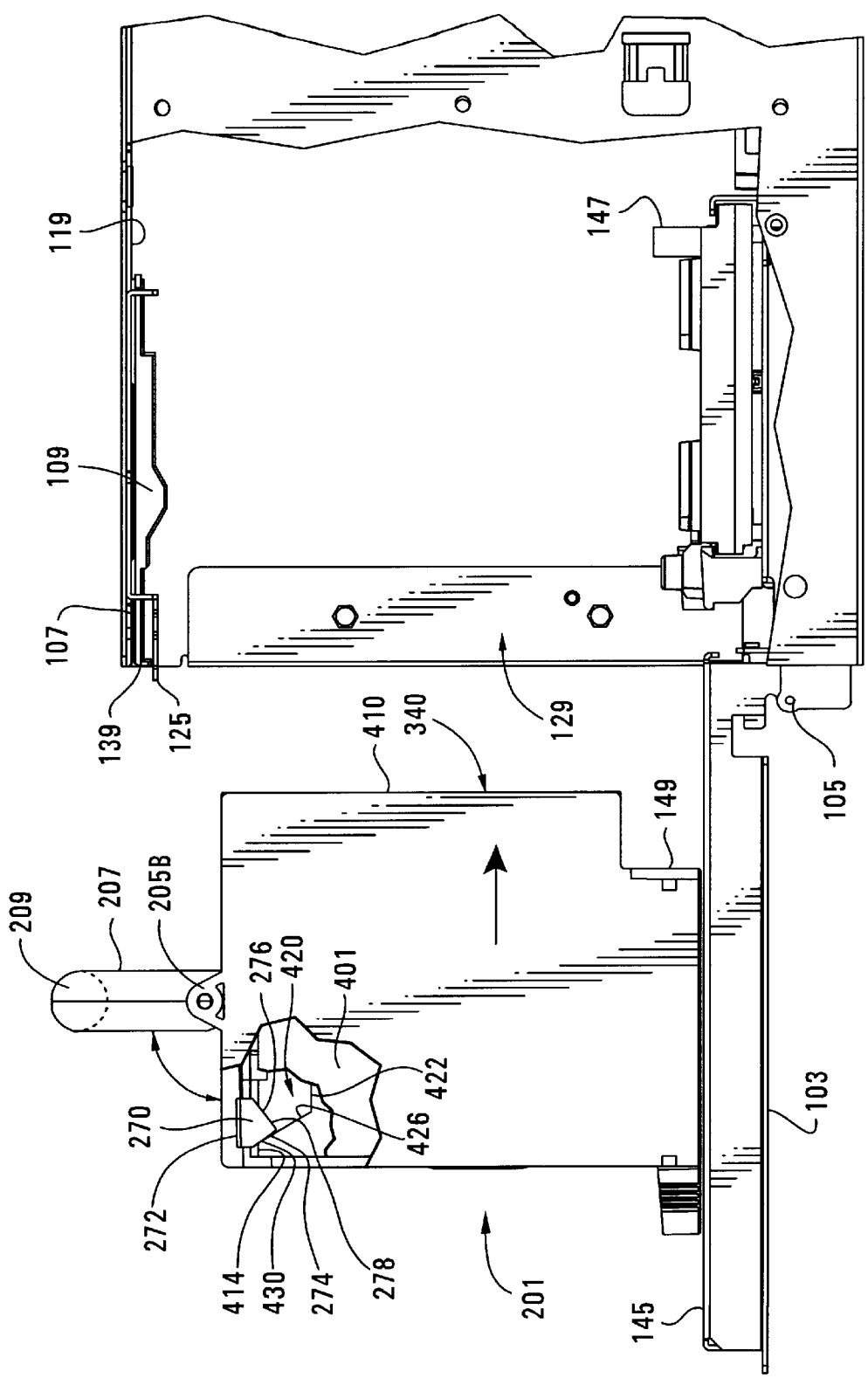
FIG. 3 illustrates a side cutaway view of the inventive magazine being inserted into the autochanger library of FIG. 1.

The detent mechanism 211 secures each media piece 401 within the magazine 201 while the handle 203 is in a transport position (see FIG. 3). When the handle grip 207 rests against the magazine 201 and the door is closed to relocate the restraining sleeve 109 to a second position as illustrated in FIG. 1, the media pieces 401 can be removed from and inserted into the magazine 201 by a picker device (not shown) of the autochanger 101. However, as long as the library door 103 is open and the sleeve 109 is in a first position (see FIGS. 3 and 5), any final force that the user or the library stop bracket 147 may apply to the inserted magazine will not dislodge a cartridge from magazine.

The magazine 201 of the above embodiment is adapted to store six media pieces, of which, the media cartridge 401 is an example of a digital linear tape. It is to be understood, however, that the magazine 201 may be modified to store more or less media cartridges, and the components thereof may be adapted to store other forms of media. For example, the magazine may be adapted to operate with several different media formats, "media pieces" may comprise optical discs, magnetic discs, and magnetic tapes such as digital linear tapes, CD's etc. In addition, a conventional detent mechanism 211 may be used to restrain the media pieces within a magazine for the above embodiment.

For further detail regarding known library structures, magazines, detent mechanisms and the autochangers that contain them, the following reference are all incorporated herein for all that they disclose: U.S. patent application Ser. No. 09/290,926 filed Apr. 13, 1999 for "AUTOMATED OPTICAL DETECTION SYSTEM AND METHOD" of Gardner; U.S. patent application Ser. No. 09/291,242 filed Apr. 13, 1999 for "GUIDANCE SYSTEM AND METHOD FOR AN AUTOMATED MEDIA EXCHANGER" of Gardner et al.; U.S. patent application Ser. No. 09/179,793, filed Oct. 27, 1998 for "MAIL SLOT DATA CARTRIDGE EXCHANGE SYSTEM FOR USE WITH A DATA STORAGE SYSTEM" of Thayer, et al.; U.S. Pat. No. 6,042,205, filed Apr. 25, 1999 for "MEDIA HOLDING DEVICE INCORPORATING A MEDIA LOCKING MECHANISM" of Coffin et al., and U.S. patent application Ser. No. 09/257,322, filed Feb. 25, 1999 for "DATA CARTRIDGE EXCHANGE APPARATUS" of Mueller, et al.

Figure 2:
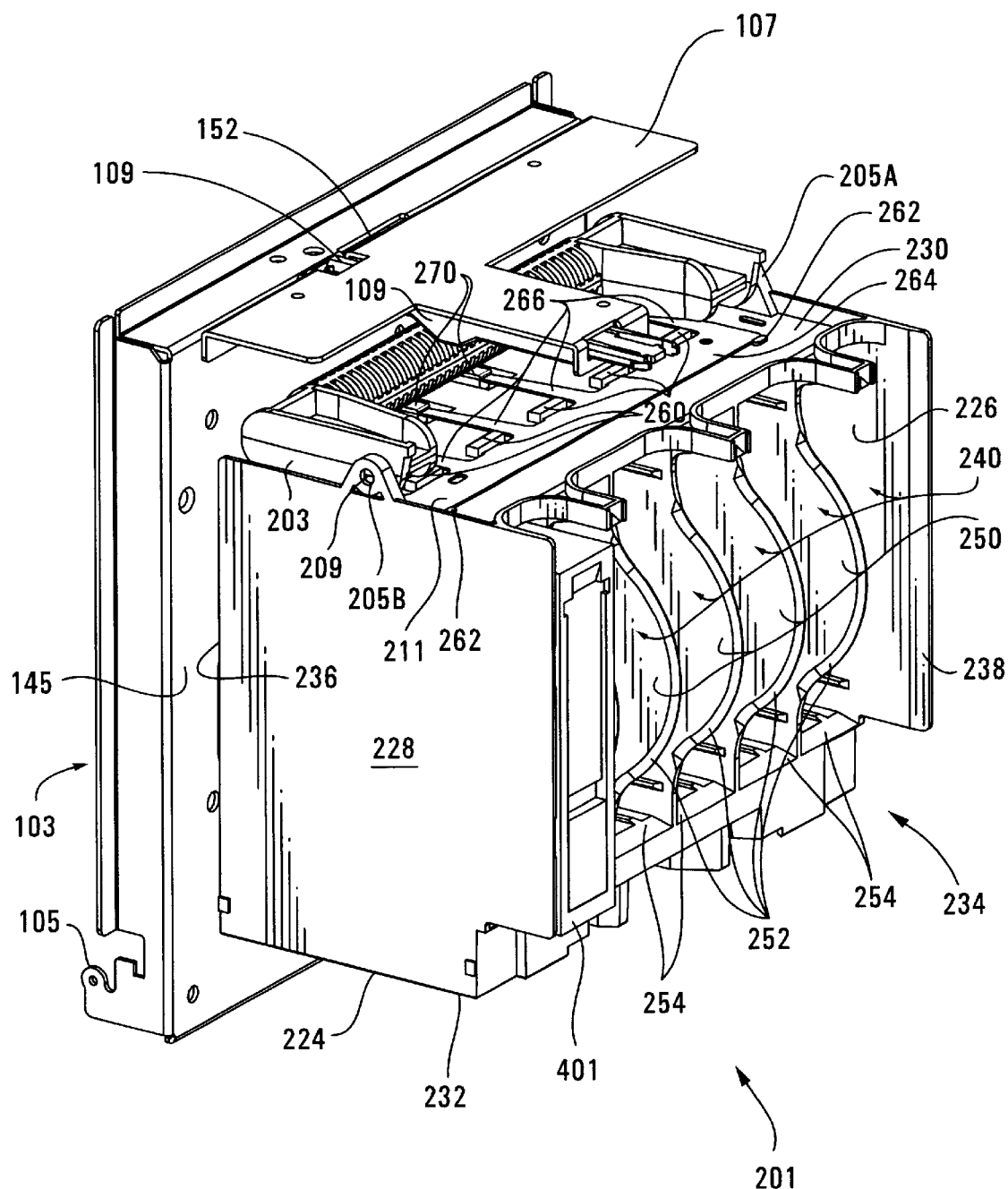
FIG. 2 illustrates a detailed perspective view of the inventive system components without the autochanger library of FIG. 1.

Referring to FIG. 2, the magazine 201, the stop bracket 107 and the library door 103 have been removed from the library structure 101 of FIG. 1 to further illustrate the inventive components of the present invention. In this perspective view, the magazine 201 provides a housing 224 to which the handle 203 and detent mechanism 211 are attached. The housing 224 includes a right portion 226, a left portion 228, a top portion 230, a bottom portion 232, a front portion 234, and a back portion 236. The right portion 226 extends to the proximity of the front portion 234 and forms an edge 238. Likewise, the left portion 238 extends to the proximity of the front portion 234 and forms another edge (not shown).

The front portion 234 defines a plurality of slots 240, sometimes referred to herein as media holding locations or bays. The slots 240 may be formed by coupling a plurality of spaced dividers 250 within the housing 224, wherein the dividers 250 are parallel to the right and left portions 226 and 228. The dividers 250 may have beveled edges 252 that serve to guide the media pieces into the slots 240. The slots 240 may have inclined surfaces 254 on the bottom portion 232 that also serve to guide the media pieces into the slots 240. The media cartridge 401 is illustrated as being located in a slot 240 adjacent the left portion 228.

The right portion 226 of the housing 224 provides a right hinge portion or transport tab 205A that extends upward beyond the top portion 230. The left portion 226 of the housing 224 provides a similar left hinge portion or transport tab 205B that also extends upward beyond the top portion 230. The right and left hinge portions 205A and 205B have a hole 209 formed in a central region for receiving a pin that pivotally secures the handle 203 to the housing 224 in a conventional manner.

The top portion 230 of the housing 224 includes a plurality of elements that are used to secure the detent mechanism 211 to the housing 224. For example, in this embodiment, the top portion 230 includes a plurality of hanger and alignment elements 260 and 262, respectively. The hanger and alignment elements 260 and 262 may be integrally formed into the top portion 230 of the housing 224. In particular, the hanger element 260 provides a bridge-shaped structure that provides enough space under the bridge to receive a tab from the base 264 of the detent mechanism 211. To work in compliment, the alignment elements 262 provide a wall structure that serves to align the detent mechanism base 264 relative to the housing top surface 230. Consequently, the combination of the hanger and alignment elements 260 and 262 allows the detent mechanism 211 to be attached to the top portion 230 of the housing 224 without the need of fasteners.

The detent mechanism 211 includes a plurality of fingers 266. The fingers provide a tapered shape to allow for a greater deflection of the finger 266 at a distal end of the fingers adjacent the backside 236 of the housing 224. The fingers 266 also include a locking element 270. Each locking element attaches to the distal end of a finger 266 by molding over the locking element 270 onto the finger 266 in a known manner.

In the above embodiment, the detent mechanism 211 is made from a single sheet of stainless steel, extra hard, that is approximately 0.635 millimeters thick. The use of extra hard stainless steel reduces the probability of the detent mechanism 211 from failing due to fatigue. The stiffness of the fingers 266 will depend on their thickness, width and length. The locking element is made from a blend of nylon.

FIG. 3 illustrates the autochanger library 101 having the door 103 in an open position and the magazine 201 in a transporting location ready for insertion. Consequently, the handle 203 is still in a position for transporting a magazine 201 containing media cartridges 401. FIG. 3 also illustrates a partial cut away view of the cartridge of the magazine and the detent magazine having a finger 266 and a locking element 270.

As illustrated in the partial cut-away of the magazine 201, the locking element 27 may be generally triangle-shaped with a top region 272 attaching to and being parallel with the length of the finger 266, and a bottom region having a back angled portion 274 and a front angled portion 276. The back and front angled portions 274 and 276 intersect at a point 278 and provide angles similar to 55 and 38 degrees relative to a plan being parallel with the length of the fingers 266.

The media cartridge 401 provides a front side 410, a back side 412, a top side 414 and a bottom side (not shown). The dimensions of the cartridge 401 accommodate the size of a magazine slot 240 (see FIG. 6). The top side 414 provides a trench 420 defined by a back portion 426, a lower portion 422, and a front portion (not shown). When the cartridge 401 is located in a magazine slot, as illustrated, the back portion 426 may contact the back portion 274 of the locking element 270 at an intersection point 430.

To better understand how the library door 103, stop bracket 107, and retaining sleeve 109 interact with a magazine 401 to restrain a cartridge contained therein, a perspective view of each element will now be discussed with reference to FIGS. 4A and 4B.

Figure 4A:
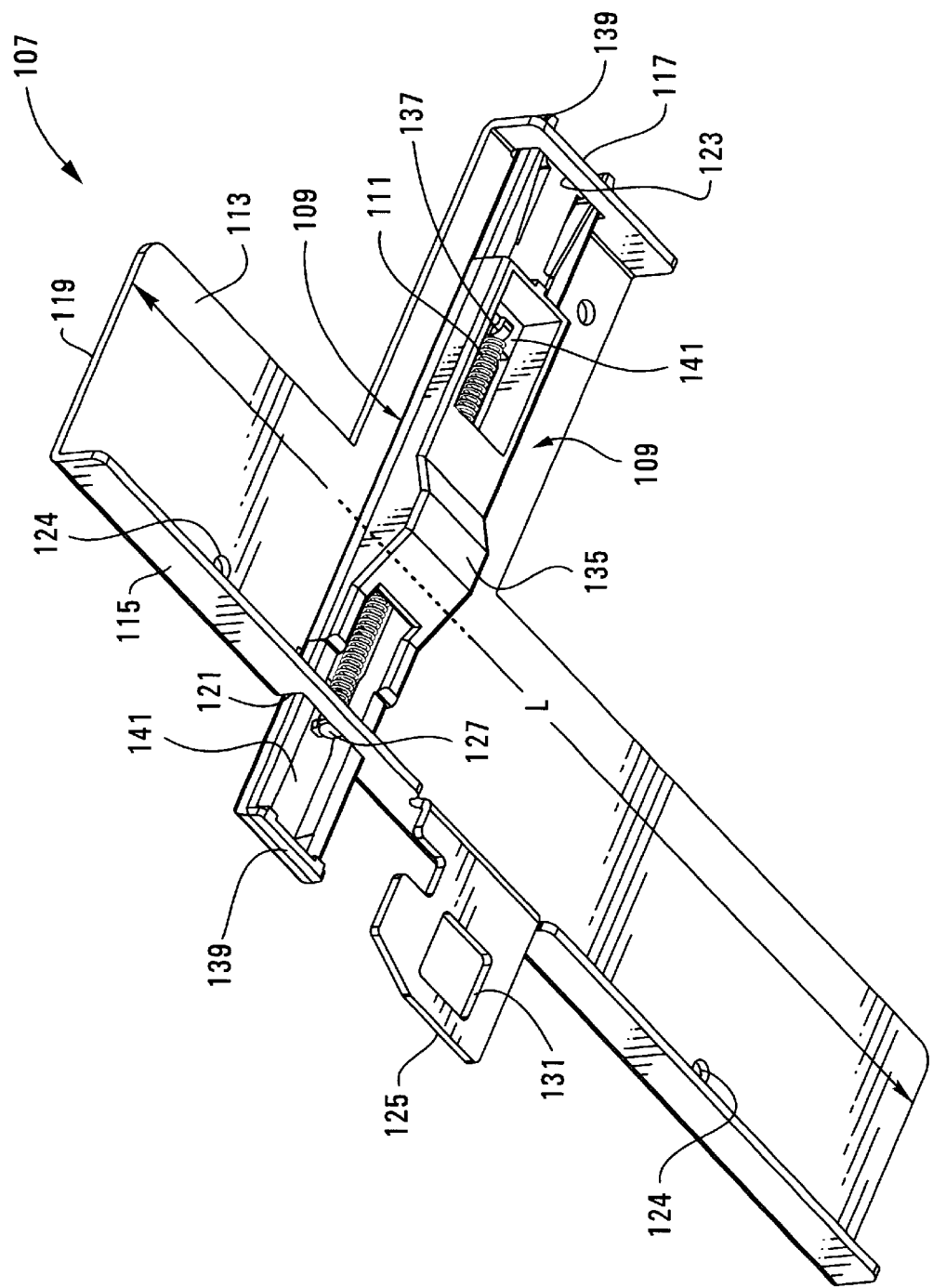
FIGS. 4A and 4B illustrate a front perspective view of the library stop bracket assembly and door in accordance with the present invention.

FIG. 4A illustrates a bottom perspective view of the stop bracket 107 and restraining sleeve 109 having a restraining spring 111 being coupled therebetween. The bracket 107 provides an "T" shaped structure having a front and a back flange 115 and 117, respectively. Each flange extends away from a top surface 119 of the bracket and includes a front and back sleeve window 121 and 123 positioned adjacent to a central location of the flange length "L". The top surface 119 attaches to the ceiling of the library cavity by a conventional means, such as machine screws or rivets, using attachment holes 124.

The front flange 115 includes a lock tab 125 and a spring mount 127. The spring mount 127 is a mesa structure positioned within the front sleeve window 121. The lock tab 125 is laterally separated from the top interior surface 119 of the stop bracket and the top cavity surface of the library 101. The lock tab 125 extends in a direction parallel with the top bracket surface 119 to a region outside of the library cavity 129. The lock tab 125 also includes a centrally located hole 131 for receiving a retention clip 154 of the locking mechanism 150 (see FIG. 4B).

The front and back sleeve windows 121 and 123 dimensionally accommodate the restraining sleeve 109. The restraining sleeve 109 generally forms a rectangular box having a plateau structure 135 covering a central region of the box cavity 141. The box cavity 141 dimensionally accommodates the restraining spring 111 that attaches to the spring hook 137 positioned within a back region of the cavity 141. The other end of the restraining spring 111 attaches to the spring mount 127 within the front sleeve window 121.

Figure 5:
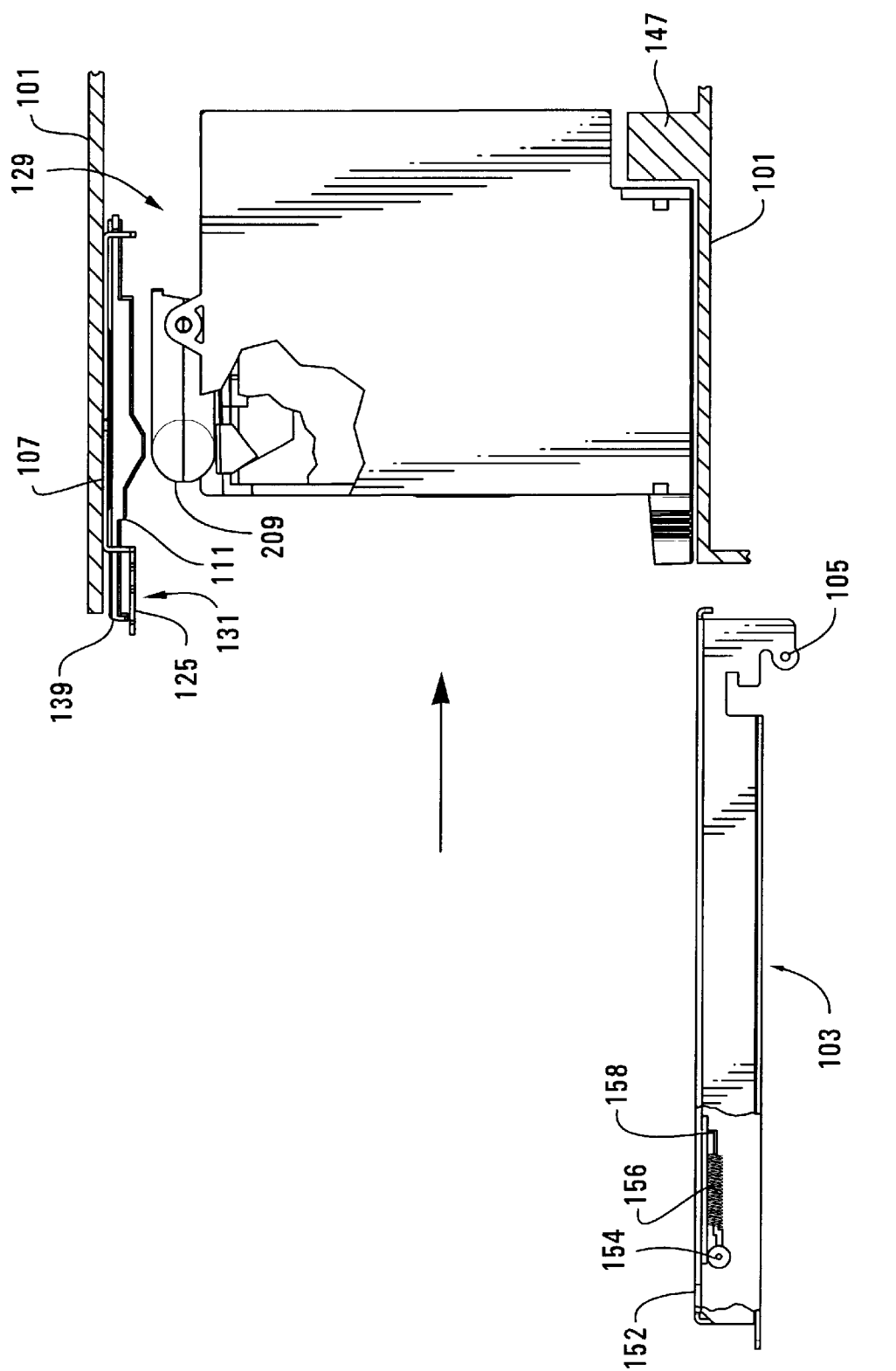
FIGS. 5 and 6 illustrate a partial side cutaway view of the magazine positioned within the autochanger library before and after the library door is closed.

When the arm or sleeve 109 is inserted into the bracket 107 with the restraining spring 111 coupled therebetween, as illustrated, a minimal force is created by the spring to position the front end 139 of the restraining sleeve 109 to an area adjacent a boundary of the library cavity (see FIGS. 3 and 5). This force can be overcome when the library door is closed to receive the lock tab 125 and enclose the magazine 201 within the cavity 129. In particular, as the lock tab 125 receives the door 103, the interior surface 145 of the door 103 interacts with the front end 139 of the restraining sleeve 109. This interaction moves the sleeve 109 into the library cavity 129 and extends the spring 111 until the door is closed.

As mentioned earlier, as long as the door is closed, the plateau structure 135 will be positioned such that the handle grip can move enough for a media cartridge to be removed from or inserted into the magazine by the picker of the autochanger. In contrast, as long as the door 103 is open, the sleeve plateau 135 resides above the grip 209 of the handle 203 (see FIG. 5) to prevent a cartridge 401 from moving out of the magazine just before, or after, a magazine has been fully inserted into the magazine.

In alternative embodiments (not shown), the skilled artisan should appreciate that the bracket 107 could be removed so that the retention sleeve 109 movable couples directly to the ceiling of the cavity and the lock tab 125 is integrally formed as part of the autochanger library. In addition, the retention sleeve 109 could be an arm pivotally coupled to the bracket 107 or ceiling of the cavity 129 by a conventional method to rotate into the cavity 129 as the door 103 encloses the magazine 201 within the cavity 129. With the above embodiments, persons of ordinary skill in the relevant arts should also appreciate that the spring 111 could be removed to eliminate the automatic return function it provides. Of course, by removing a spring coupled between the bracket 107 (or cavity 129) and the sliding (or rotating) retention arm 109 would dictate that the user would need to slide or rotate the arm back to a first position for restraining the detent mechanism from flexing before a magazine filled the cavity of the library.

Figure 4B:
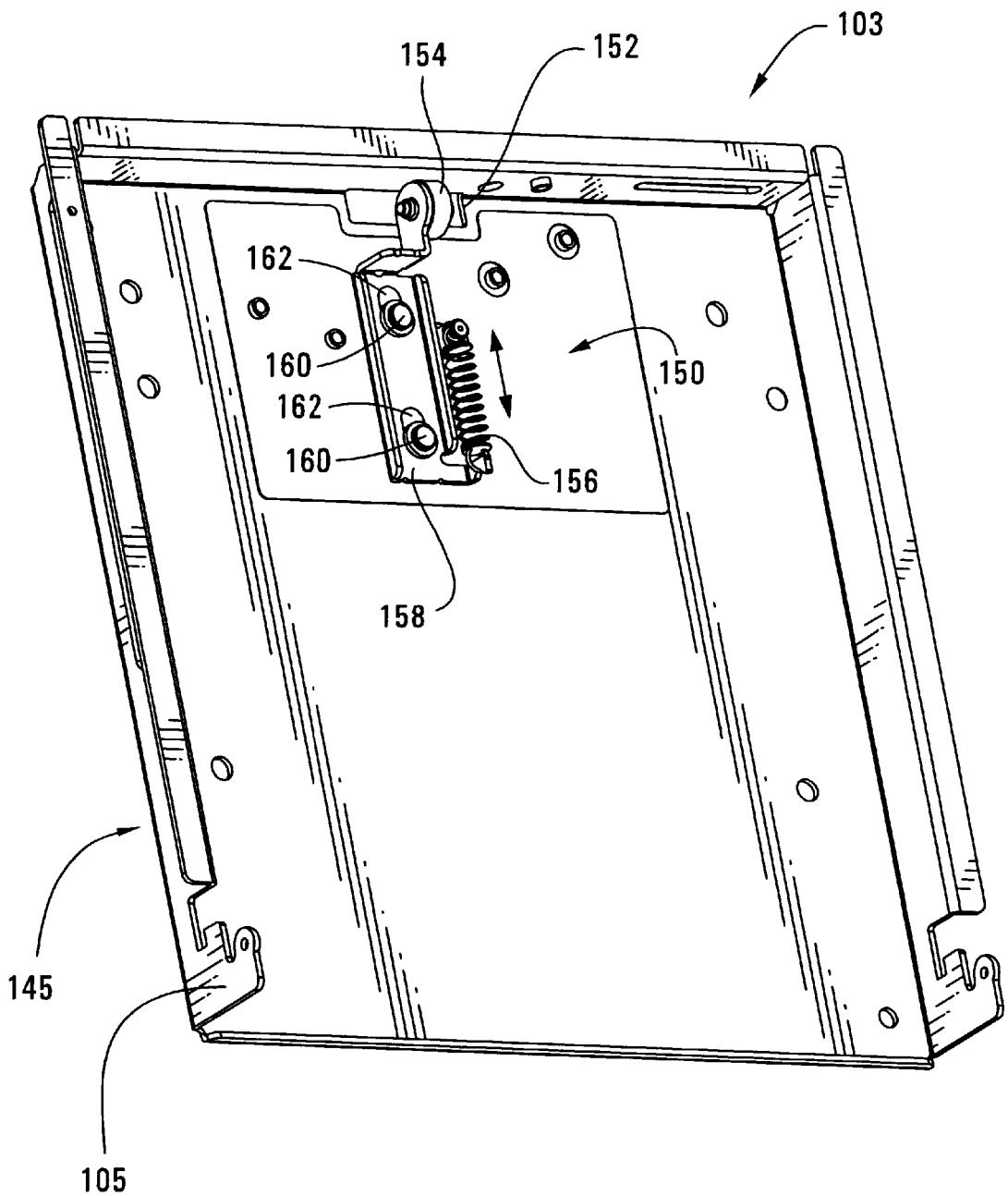

Turning now to FIG. 4B, a front perspective view of the library door 103 illustrates the lock mechanism 150 for receiving the lock tab 125. In particular, the door 103 includes a window 152 positioned above the lock mechanism 150 in a top central region of the door 103. The location of the door window 152 compliments the position of the lock tab 125 so that the lock tab 125 can extend through the door window 152 and interact with the lock mechanism 150 when the door is closed. The lock tab 125 interacts with the lock mechanism by forcing a retention clip 154 in a downward direction to extend the spring 156 coupled between the door and a clasp plate 158. Once the lock tab 125 is fully inserted, the spring will compress slightly so that the retention clip 154 will fill a portion of the hole 131 of the lock tab 125.

The securing elements 160, such as machine screws or rivots, are positioned through slide holes 162 so that the retention clip 154, spring 156, and clasp plate 158 can move in the directions of the arrow without being separated from the surface of the door 103. As the door 103 opens to expose the cavity 129 of the library (see FIG. 3), the force provided by the spring 156 moves the clip 154 and plate 158 back to a receiving position as illustrated.

Now that the primary structural features of the invention have been described, an example process for using the same will follow. For this example, the magazine of FIG. 3 having a single cartridge will be used, however, the skilled artisan should appreciate that a smaller or larger magazine may be used having one or all bays of the magazine filled with a media cartridge.

As mentioned above, once the magazine 201 is positioned over an interior surface 145 of the library door 103 as illustrated in FIG. 3, the magazine is ready to be received by the cavity 129 of the library assembly 101. At this point, the user will allow the handle 207 to rotate down so that the handle grip 209 resides over the locking element 270. Next, the user will push the magazine across the library door surface 145 and into the library cavity 129 until an interior block 147 within the library cavity 129 stops the magazine 201 to indicate a complete insertion.

It is at this point that a cartridge has the highest likelihood of being dislodged from the magazine because of the force created by the magazine being stopped by the interior block 147. However, as described above, the present invention prevents this occurrence by the interaction between the sleeve plateau 135, handle grip 109, detent mechanism 111, and the media cartridge 401. In particular, as the magazine is abruptly stopped by the interior block 147, the sleeve plateau 135 resides directly above the handle grip 209 to restrain the movement of the detent mechanism 211 and the cartridge 401 within the magazine 401.

As indicated in FIG. 5, once the magazine is completely inserted, the library door 103 can be rotated about a pivot point 105 to secure the magazine 201 within the library assembly 101. The door 103 is secured to the library once the lock mechanism 150 receives the lock tab 125 of the lock bracket 107. In particular, as the lock tab 125 moves through the lock window 152, the retention clip 154 extends the spring 156 to create the necessary force for retaining the lock tab 125 within the lock window 152. In addition, the same force will allow the restraining spring 111 of the restraining sleeve 109 to maintain an extended position.

Figure 6:
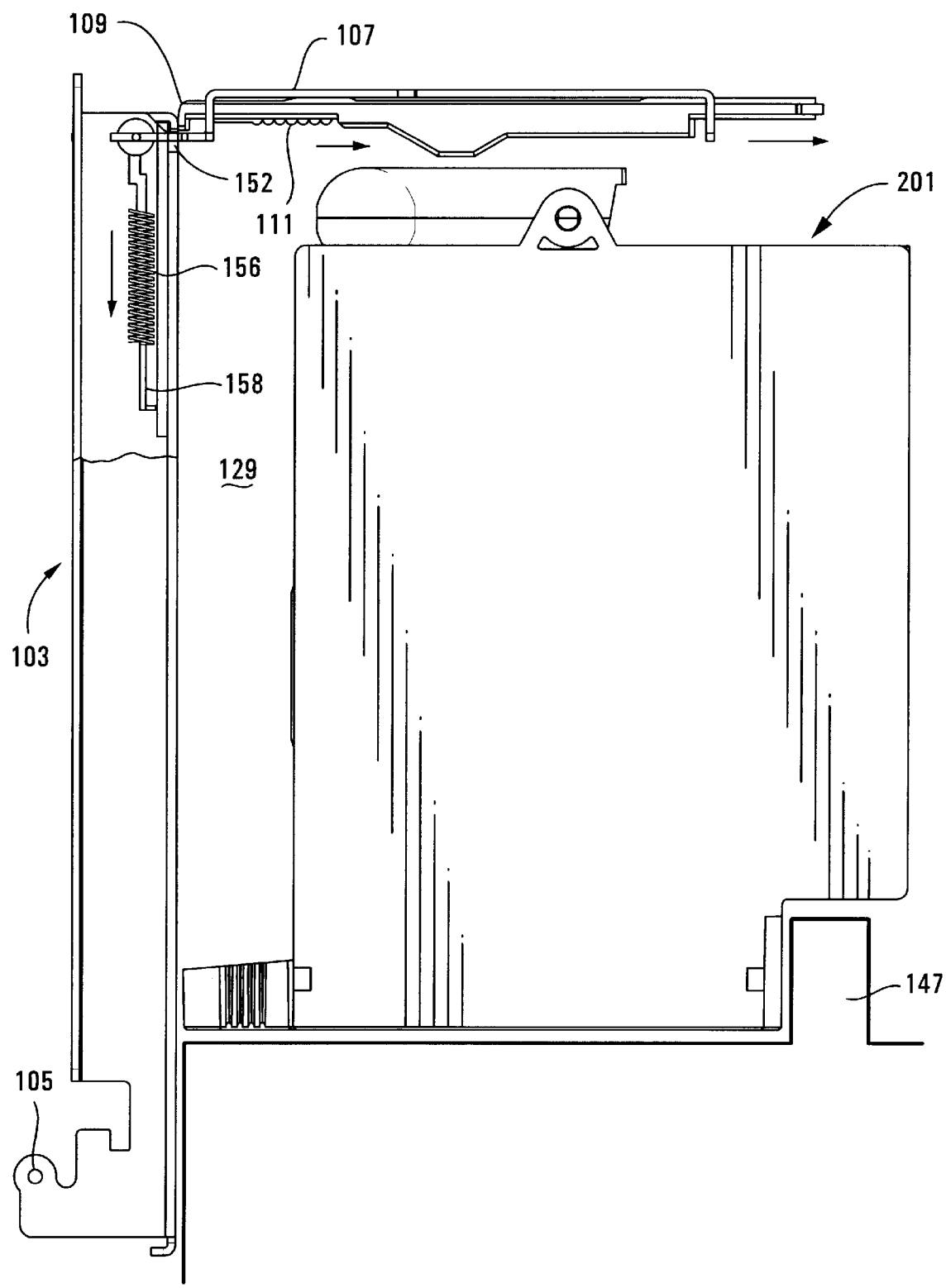

At the same time that the lock tab 125 is received by the door 103, the plateau structure 135 of the restraining sleeve 109 moves into the body of the library as the tip 139 of the restraining sleeve 109 interacts with the interior surface 145 of the door 103. Consequently, once the door is fully closed (i.e. the lock tab is fully inserted into the lock window) as illustrated in FIGS. 1, 2 and 6, the plateau 135 of the restraining sleeve 109 will have moved forward just enough to allow the handle grip 209 and locking element 270 to move up so that a cartridge 401 can be removed or inserted into the magazine 201 by a picker of the autochanger.

In summary, certain detent mechanisms of a conventional magazine create an adequate force to maintain a media piece within the magazine while the magazine is being transported to a library assembly for insertion. In addition, these conventional detent mechanisms create an adequate force to maintain a media piece within a magazine that is being contained by a library until a picker of an autochanger grabs/returns an adjacent media piece from/to the magazine. However, a conventional detent mechanism alone does not provide an adequate force to ensure that each media piece will remain within their magazine slot when the magazine is stopped by an interior block of the library during insertion. Consequently, as described in the background of invention, the force created when the interior library block stops the insertion of a conventional magazine will typically release the media pieces contained within the magazine into the autochanger prematurely, which in turn will prevent the media pieces from being utilized, stop the operation of the autochanger, and possibly require a service call.

The present invention guarantees that each cartridge contained by the magazine being inserted into the library assembly is secure within the magazine until the door of the library assembly is shut. At such time, the picker can receive and insert a media cartridge with a minimal force. Therefore, the present invention provides a reliable, cost efficient and effective way to prevent media pieces from being displaced into the library without the need for the picker to provide an additional force or provide costly and bulky picker components.

What is claimed is:

1. An autochanger system having a cavity for receiving a magazine containing a media cartridge, the magazine includes a detent mechanism that bends to allow the media cartridge to move into and out of the magazine, the system comprising:
    a movable arm coupled within the cavity having first and second positions;
    a handle pivotally coupled to the magazine, the handle includes an engagement portion being positioned to interact between the detent mechanism and the arm,
    wherein the position of the arm controls the bending of the detent mechanism as the cavity receives the magazine and while the magazine fills the cavity.

2. The autochanger of claim 1, wherein the movable arm slides or rotates within the cavity to obtain the first and second position.

3. The autochanger of claim 1, wherein the arm further includes a restraining plateau that interacts with the detent mechanism in the first position.

4. The autochanger of claim 1, further including a spring coupled between the cavity and the arm.

5. The autochanger of claim 1, further including a door having an open position to allow the magazine to be received by the system cavity and a closed position to enclose the magazine within the system cavity.

6. The autochanger of claim 5, wherein the position of the door controls the position of the arm.

7. The autochanger of claim 5, further including a bracket attached to the cavity for movably coupling the arm to the cavity.

8. The autochanger of claim 7, wherein the bracket further includes a lock tab extending to a region outside of the cavity to be received by the door.

9. The autochanger of claim 8, wherein the door further includes a window and a securing clip that interacts with the lock tab when the door encloses the cavity.

10. The autochanger of claim 9, further including a spring coupled between the securing clip and the door to secure the lock tab within the door window with the securing clip.

11. An autochanger device comprising:

a library having a cavity for receiving a magazine containing a media cartridge, the magazine includes a detent mechanism that flexes to allow the autochanger device to remove/insert the cartridge from/into the magazine when the magazine fills the cavity;

a movable arm coupled to the cavity having a first position and a second position, the first position restrains the detent mechanism from flexing as the magazine fills the cavity and the second position allows the detent mechanism to flex while the magazine fills the cavity; and a handle pivotally coupled to the magazine, the handle includes an engagement portion being positioned to interact between the detent mechanism and the arm while the magazine fills the cavity.

12. The autochanger of claim 11 further including a door that couples to an outside edge of the library cavity to enclose the magazine within the cavity.

13. The autochanger of claim 12, wherein the movable arm slides or rotates within the cavity from the first position to the second position as the door encloses the magazine within the cavity.

14. The autochanger of claim 12, further including a bracket attached to the cavity for movably coupling the arm to the cavity.

15. The autochanger of claim 14, wherein bracket further includes a lock tab extending to a region outside of the cavity to be received by the door.

16. The autochanger of claim 15, wherein the door further includes a window and securing clip that interacts with the lock tab when the door encloses the cavity.

* * * * *